April 15, 1924.
M. PETERS
PILGERING MILL
Filed Sept. 2, 1921
1,490,633
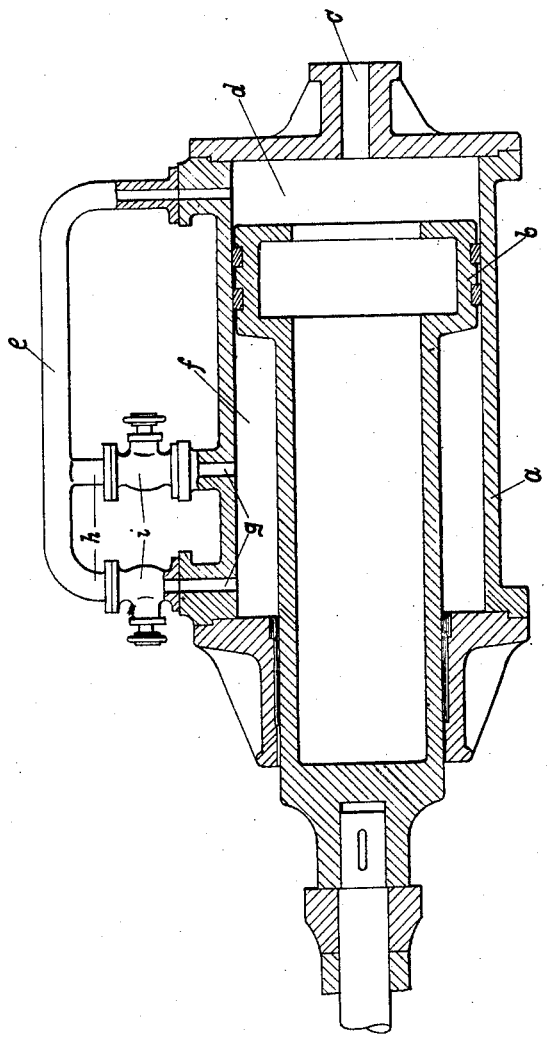
Inventor
Matthias Peters.
by
W. E. Evans
Attorney.

Patented Apr. 15, 1924.

1,490,633

UNITED STATES PATENT OFFICE.

MATTHIAS PETERS, OF DUISBURG, GERMANY, ASSIGNOR TO DEUTSCHE MASCHINEN-FABRIK A. G., OF DUISBURG, GERMANY.

PILGERING MILL.

Application filed September 2, 1921. Serial No. 498,020.

(GRANTED UNDER THE PROVISIONS OF THE ACT OF MARCH 3, 1921, 41 STAT. L., 1313.)

*To all whom it may concern:*

Be it known that I, MATTHIAS PETERS, a citizen of the German State, residing at 18 Menzelstrasse, Duisburg, Germany, have invented certain new and useful Improvements Relating to Pilgering Mills (for which I have filed an application in Germany December 13. 1918), of which the following is a specification.

The invention relates to pilgering mills and has for its object to provide means for bringing the work and mandrel into a starting position without shock. For this purpose, in a manner that has already been proposed, the mandrel is mounted upon a hollow piston of two different diameters working in a cylinder to which compressed air, gas, or the like, is supplied. The compressed air is caused to pass into the annular space between the part of the piston of smaller diameter and the cylinder where the air is further compressed and acts as a cushion to finally bring the piston and work to rest without shock.

In pilgering mills constructed according to the prior Patent 1,141,447, apertures are provided for communication between the annular space surrounding that part of the piston of smaller diameter and the space behind the piston, and a controlling sleeve is mounted, in that part of the piston of smaller diameter. The apertures and the controlling sleeve are, therefore, accessible only after the cylinder cover has been removed. As the adjustment of these apertures must be effected as often as the weight and dimensions of the work to be rolled undergo alteration, the arrangement of the apertures and the controlling sleeve in that part of the piston of smaller diameter has been proved, by practical experience, to be disadvantageous, inasmuch as the removal and replacement of the cylinder cover with every change of the work operated on, is inconvenient and wasteful of time. To avoid this disadvantage, communication is established according to the invention between the annular space surrounding that part of the piston of smaller diameter and the space behind the piston, by one or more pipes arranged outside the working cylinder. In order to be able to adapt the cushioning or braking-power to work of the most widely different dimensions and weights, it is expedient to construct the pipe connecting the two spaces aforesaid in such a manner that it discharges in the annular space in the front part of the cylinder by a number of orifices which are so arranged that they are closed or left open, by the working piston, one after the other.

In the drawing, a practical constructional form of the invention is diagrammatically represented.

$a$ denotes the working cylinder, in which is fitted the differential piston $b$. Compressed air or other motive fluid is introduced behind the piston, through the pipe $c$, into the rear cylinder-chamber $d$ (supply-chamber) which, by means of the pipe $e$, communicates with the front annular space $f$ (braking-chamber) in the front of the cylinder, so long as the openings $g$ are not closed by that part of the piston $b$ of larger diameter. It is further advantageous to provide control-valves $i$, in the branch pipes $h$ which connect the pipe $e$ with the cylinder chamber $f$, so as to enable the cross-section of the passage to be varied according to necessity.

The method of working is similar to that of the apparatus described in the specification of the prior patent before referred to; that is to say in the position shown it is assumed that the cylinder and the hollow piston $b$ are both completely filled with compressed air so that the piston will move in a direction towards the mandrel indicated in the figure. When the piston $b$ approaches the end of its stroke the openings $g$ are successively closed by that part of the piston of larger diameter. Compressed air will then be trapped between the piston and cylinder and will be still further compressed on the further forward movement of the piston, so that the speed of movement of the piston is reduced until the piston is finally brought to rest. When the energy of the moving piston has been absorbed, the highly compressed air in the annular space at the front end of the cylinder, after bringing the piston and work to rest, will cause a recoil in the reverse direction.

I claim:

1. In a pilgering mill, the combination comprising a cylinder adapted to be supplied with a compressed fluid, a piston mounted within said cylinder and adapted to leave a space between a part of said piston and the forward end of the cylinder, said cylinder having external means of communication between said space and the space behind the said piston, said means of communication being adapted to be closed so as to form a cushion, and a mandrel mounted upon said piston.

2. In a pilgering mill, the combination comprising a cylinder adapted to be supplied with a compressed fluid at its rear end, a hollow piston having two different diameters mounted in the said cylinder, the rear end of the said piston being opened and communicating with the cylinder, said piston being so arranged in the cylinder as to form an annular space between that part of the piston of smaller diameter and the forward end of the cylinder, an external means of communication between the said annular space and the space behind the piston, said means of communication being adapted to be closed so as to form a cushion, and a mandrel mounted upon the said piston.

3. In a pilgering mill, the combination comprising a cylinder adapted to be supplied with a compressed fluid, a hollow piston in said cylinder having two different diameters, the smaller part of the said piston being adapted to pass through the forward end of the said cylinder and forming an annular space around the said smaller part, a means of communication external to the said cylinder and between the said annular space and the space behind the said piston, said means of communication being adapted to be closed so as to form a cushion, and a mandrel mounted upon the smaller end of the said piston.

4. In a pilgering mill, the combination comprising a cylinder adapted to be supplied with a compressed fluid, a hollow piston in the said cylinder having two different diameters and forming an annular space in the front part of the said cylinder, external means of communication between the said annular space and the space behind the said piston comprising a series of openings in the front part of the said cylinder, said means of communication being adapted to be closed in the movement of the said piston, so as to form a cushion, and a mandrel mounted upon the said piston.

MATTHIAS PETERS.